Dec. 7, 1965   A. C. CORDRAY ETAL   3,221,780
CUP TRANSFER MECHANISM FOR FRUIT JUICING MACHINE
Filed Dec. 31, 1962   4 Sheets-Sheet 1

INVENTORS
ARTHUR C. CORDRAY
TRACY ACOSTA
BY
Hill, Sherman, Meroni, Gross & Simpson
ATTORNEYS

INVENTORS
ARTHUR C. CORDRAY
TRACY ACOSTA

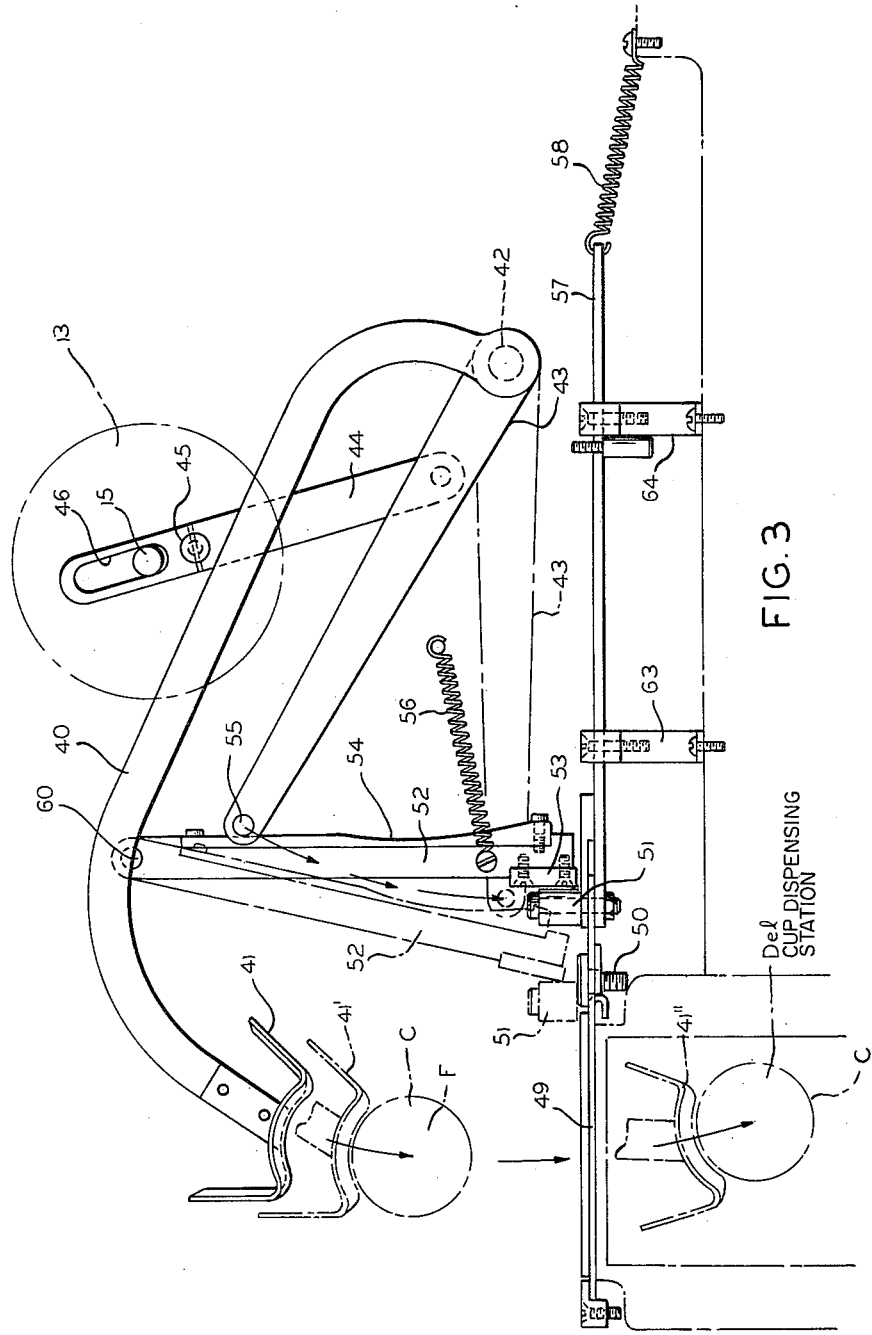

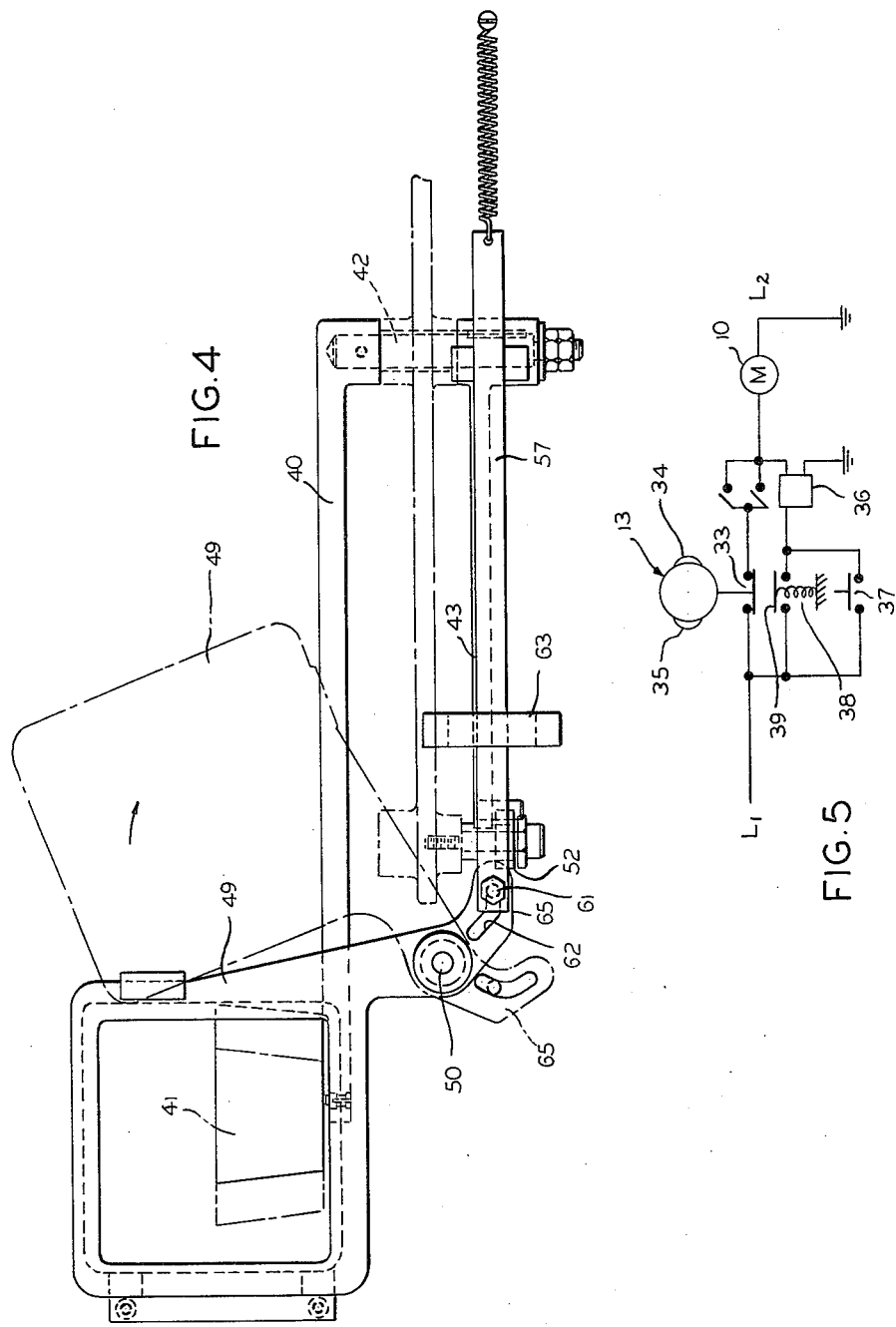

United States Patent Office 3,221,780
Patented Dec. 7, 1965

3,221,780
CUP TRANSFER MECHANISM FOR FRUIT
JUICING MACHINE
Arthur C. Cordray, 841 Montford Road, Cleveland
Heights, Ohio, and Tracy Acosta, 2700 S. Wood St.,
Chicago, Ill.
Filed Dec. 31, 1962, Ser. No. 248,576
6 Claims. (Cl. 141—83)

The present invention relates to improvements in fruit juice extracting and dispensing machines and more particularly to an improved mechanism for automatically positioning individual cups in a filling station and delivering the cups out of the machine when filled.

While the features of the invention may be employed in various environments requiring the automatic dispensing and delivery of cups, it is particularly advantageous for use in an automatic fruit juicing machine such as of the type shown and described in U.S. Patent 2,317,006 Weightman et al. or U.S. Patent 2,817,935 Fisher et al.

In an automatic fruit juicing machine of this type, oranges, or other similar fruit, are individually delivered from the bin, cut, and squeezed. The juice flows to a filling station and the present mechanism functions to position individual cups in the filling station so that they may be filled within the machine and pushes the cups through a door which is opened outside of the machine where they are accessible to the consumer. The machines may be coin operated so that when a coin is inserted the complete operation of the machine automatically follows and the amount of juice delivered to the cup may be predetermined such as by a scale in the filling station which shuts off the flow when the cup reaches a certain weight. To provide a substantial supply of cups in the height available they are carried in separate stacks at the side of the machine and cups are alternately brought from the sides of the machine across to the filling station. As will be apparent the success of the machine depends upon the continued reliable operation of all of the elements without attention so that a coin operated machine may be used in a public place without an attendant. The reliable continued delivery of the cups to the proper position in the filling station and the delivery from the filling station to the exterior of the machine is a critical part of the operation so that a cup will always be present when the squeezed juice is released to flow down into the filling station and so that the filled cup will be reliably delivered to the exterior of the machine.

It is accordingly an object of the present invention to provide an improved automatically operated cup positioning and delivery mechanism which is extremely reliable and has a long operating life requiring substantially no attention or adjustment.

A further object of the invention is to provide an improved cup positioning delivery mechanism which is simplified in construction to promote long reliable operating life, to reduce manufacturing cost and to insure accuracy and reliability of operation wihout adverse effects from wear.

A still further object of the invention is to provide an improved cup delivery mechanism which can be operated by a single motor for driving cup delivery mechanism, cup pushout mechanism and door operating mechanism.

Other objects, advantages and features will become more apparent with the teaching of the principles of the invention in connection with the disclosure of the preferred embodiment thereof in the specification, claims and drawings, in which:

FIGURE 3 is a fragmentary top plan view showing mechanism for pushing the cup out of the machine from the filling station to the delivery station;

FIGURE 4 is a front elevational view with parts omitted for clarity, of the mechanism for operating the door; and FIGURE 5 is a simplified wiring diagram showing circuitry for operating the motor.

On the drawings

The mechanism is driven by an operating motor 10 which operates through a full cycle having a first portion and a second portion. In the first portion of the cycle one of left or right cup delivery arms is operated. In the second portion of the cycle a cup pushout arm is operated and a door is opened.

In one cycle one of the cup delivery arms is operated, and in a succeeding cycle at the other cup delivery arm is operated.

The motor 10 operates a first drive means for the cup delivery arm, which includes a Geneva drive 11 and a cam 12. The Geneva drive is arranged so that while the driving portion turns through 360°, the cam 12 is rotated through 180°, the 180° rotation occurring only during the first portion of the motor cycle.

The motor 10 also drives a cam 13 for operating the pushout arm and the door, and the cam 13 is arranged to have a rest portion for the first 180° of rotation, and an operating portion for the next 180° of rotation. Thus the pushout arm and the door are operated for the second portion of the motor cycle.

The motor is started for operation by the starting of the overall machine such as is caused by an operator inserting a coin in a coin actuated switch and the motor will automatically be stopped at the end of the first portion of its cycle. It is automatically started for the second portion of the cycle by a scale switch operated by the cup on a scale platform reaching a predetermined weight as it is filled with juice. The motor then moves through the second portion of its cycle and is automatically stopped at the end of the cycle.

Cup delivery arms

Figure 2:
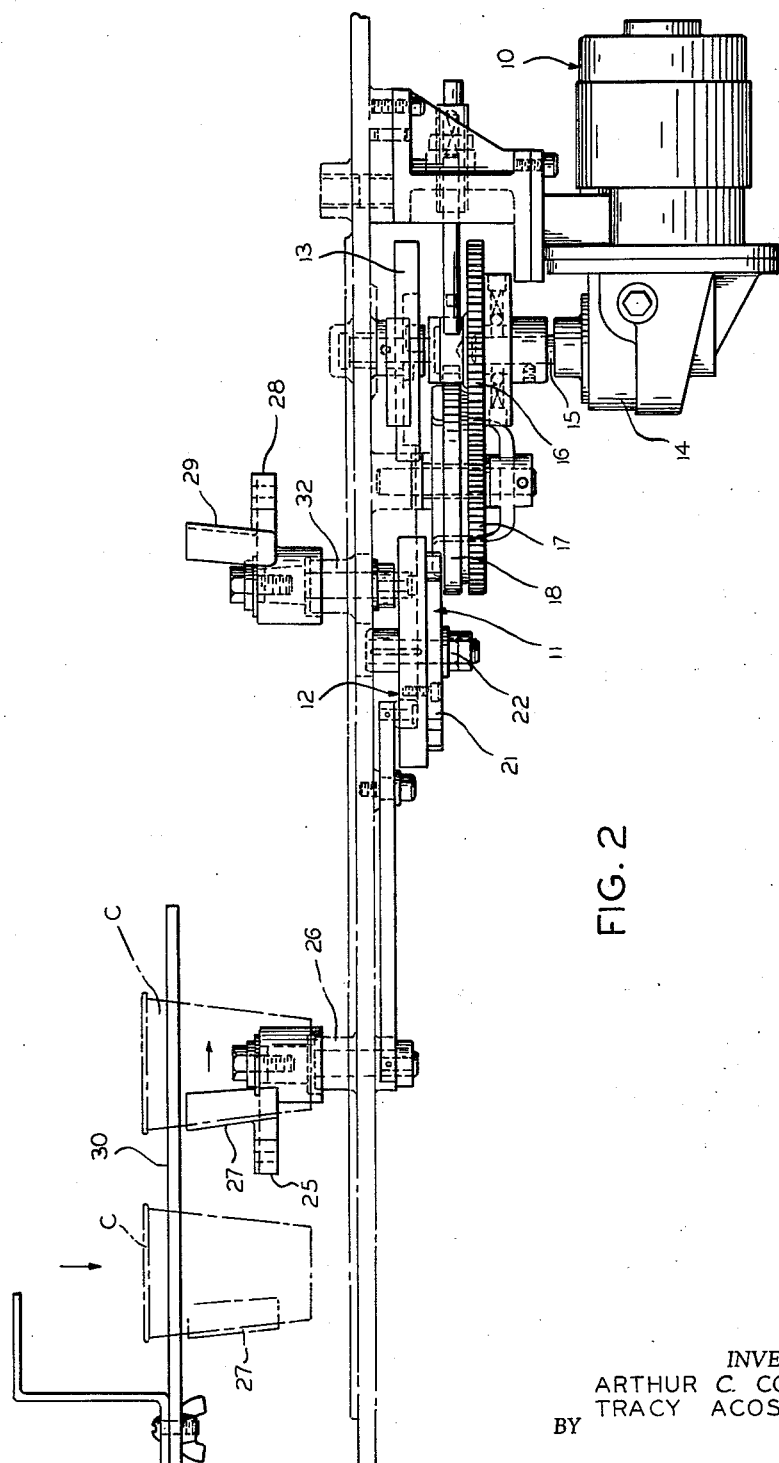
FIGURE 2 is a front elevational view of the cup handling mechanism.

In greater detail, the motor 10 is connected to a gear reduction 14, FIGURE 2, and drives a shaft 15 carrying a first drive gear 16.

Figure 1:
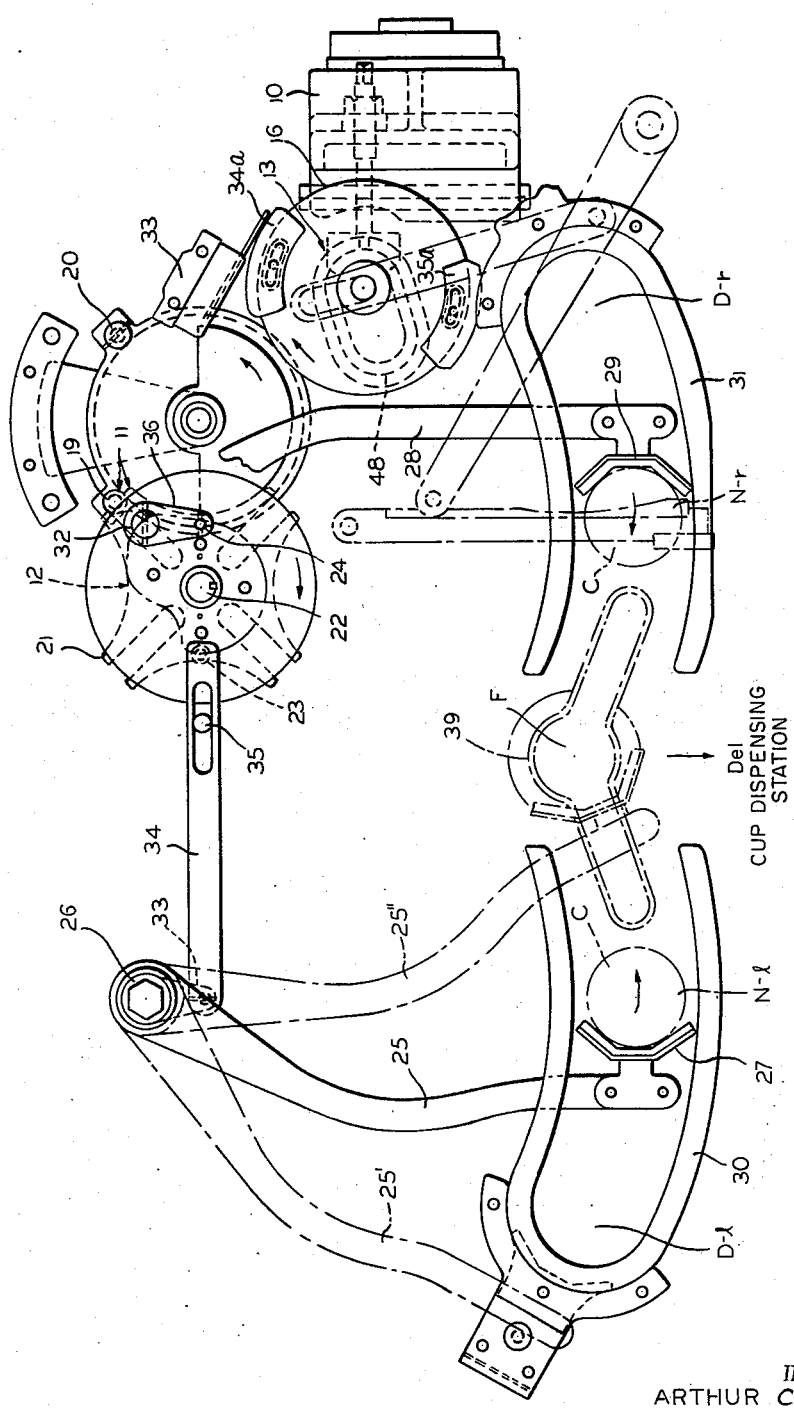
FIGURE 1 is a top plan view shown in somewhat schematic form of a cup handling mechanism constructed and operating in accordance with the principles of the present invention.

The first gear 16, FIGURES 1 and 2, drives a second gear 17 which carries a drive plate 18 for the Geneva drive 11. The Geneva drive has drive pins 19 and 20 which are successively engaged in the radial slots of a driven plate 21 of the Geneva drive.

The driven plate of the Geneva drive is secured to a support shaft 22 which drives the cam 12. The cam 12 engages followers 23 and 24 which respectively operate left and right hand cup delivery arms 25 and 28.

The left hand cup delivery arm 25 carries a cup pusher 27 at its outer end for pushing a cup C. The right hand arm 28 carries a cup pusher 29 for pushing a cup C. The left hand arm 25 is mounted on a pivotal support 26, and the right hand arm is mounted on a pivotal support 32.

The arms receive cups from suitable release mechanisms at each side of the overall machine. Individual cups are alternately dropped on slides 30 and 31 after the arms 25 and 28 move back to a cup delivery position. The cup release mechanisms may be of various suitable types as will be appreciated by those versed in the art. The cups may be dropped by other automatic mechanism operated by starting a machine cycle or operated by the cup delivery arms themselves moving back into the delivery position.

The arms are maintained, when the machine is not operating, in their neutral position as shown at N–1 and N–r in FIGURE 1. For their individual cycles of operations, the arms 25 and 28 will move where their pushers 27 and 29 are in the neutral positions N–1 and N–r respectively back to a delivery station D–1 and D–r respectively. The cups will then be pushed forwardly along the rails 30 and 31 to a filling station F. At the filling station the cup rests on a scale platform 39.

The arm 25 in moving through its positions first moves back to the dotted line position 25′ and then moves forwardly to the dotted line position 25″, and the pusher 27 is respectively moved from the neutral position N–1 back to the delivery station D–1 to the filling station F.

Connected to the cup delivery arm 25 is a short crank arm 33 and a rod 34 connects between the arm 33 and the cam follower 23. The rod 34 has a slot therein with a guide pin 35 in the slot for holding the follower 23 in alignment with the cam 12.

The right delivery arm 28 is operated by a short crank arm 36 which supports the follower 24 at its end. The followers 23 and 24 are 180° apart and the cam 12 has a rest portion, which is the lower portion as shown in FIGURE 1, and an actuating portion, which is the upper portion shown in FIGURE 1. Thus when the cam 12 rotates 180°, one of the delivery arms 25 or 28 will be operated while the other remains at rest.

Operating circuit

The mechanism is started by starting the motor 10 which will drive the gear 16 through 180° for the first part of the cycle. At that point a switch operating lug 34a on the cam plate 13 will engage the switch 33 to stop the motor. The circuit arrangement is shown in FIGURE 5 and the motor is started by a starting switch 37 which operates a relay 36 having a holding circuit. Electrical energy is supplied through the lines L–1 and L–2, and as illustrated schematically after 180° of rotation the switch 33 will open the holding circuit. The relay 36 is again actuated by a scale switch 38 which is operated when the cup on the scale platform 39 is filled to a predetermined weight. The motor 10 will then operate through the second part of its cycle until an opposite lug 35a on the cam plate 13 again opens the holding switch 33.

Cup pushout arm

After the cup has been delivered to the filling station F and filled to the predetermined weight, the flow of juice to the cup is shut off by suitable mechanism, and the motor 10 operates for the second portion of its cycle to pivot a pushout arm 40 from the solid line position shown in FIGURE 3 to the dotted line position 41′ where it engages the cup C and moves it to the delivery position Del. as shown at 41″.

The pushout arm 40 is pivotally supported on a pin 42 and a door operating cam arm 43 is also secured to the pin 42, FIGURES 3 and 4.

A rod 44 is pivotally connected to the cam arm 43 at one end and carries a follower 45 which rides in a slot 48 in the cam plate 13. The rod has an elongated axial slot 46 through which projects the shaft 15 for supporting the rod 44. The closed cam track 48 has a 180° rest portion in which the follower pin 45 rides for the first portion of the motor cycle. For the second portion of the motor cycle the follower rides in the actuating portion of the cam track 48 to operate the rod 44 and thereby operate the cup pushout arm.

Door

Simultaneously with the operation of the pushout arm 40, a door 49 moves from the solid line closed position of FIGURE 4 to the dotted line open position. The door is pivotally supported on a support pin 50. For operating the door a boss 51 is pushed from the solid to the dotted line position of FIGURE 3. The boss is engaged by a plate 53 on a pivotal follower arm 52 having a cam follower surface 54. A pin 55 on the end of the door operating cam arm 43 slides against the surface 54 when the arm 43 moves from the solid to the dotted line position of FIGURE 3 thus pushing the door operating cam arm 43 from the solid to the dotted line position. The follower arm 52 is urged to its solid line position by a tension spring 56.

The boss 51 is secured to a sliding bar 57 supported in guides 63 and 64 on the front of the machine or machine cabinet, and the cabinet may have the construction of the aforementioned patents Weightman et al. 2,317,006, or Fischer et al. 2,817,935. The bar 57 is urged in a direction to hold the door 49 in a closed position by a tension spring 58. The bar 57 is connected to the door by a pin 61 extending into a slot 62 in a lower arm 65 on the door, the slot being shaped so that the door will be moved to open position when the bar 57 is moved to the left, as shown in FIGURES 3 and 4.

Summary of operation

In summary, the mechanism as used for example, in an automatic orange juicing machine, will be started by an operator inserting a coin to close a switch 37, FIGURE 5. This will start the motor 10 for the first portion of its cycle to drive the cam plate 13 through 180° and during which time the door 49 and the pushout arm 40 are not operated. The cam 12 is rotated through 180° by the Geneva drive 11 to operate one of the cup delivery arms 25 and 28. At the end of the first portion the switch 33 stops the motor 10. When the cup has been filled with a predetermined weight of juice, the scale switch 38 closes to start the motor 10 through the second portion of its cycle and during this time the delivery arms 25 and 28 remain stationary and the door 49 is opened and the pushout arm 40 pushes the cup C from the filling station F to the delivery station Del. This operation is caused by the cam 48 driving the rod 44, FIGURE 3, to pivot the pushout arm 40, and move the cam arm 43 along the cam surface 54 to open the door.

Thus it will be seen that we have provided an improved automatic cup handling and delivery mechanism for use in a drink dispensing machine such as an automatic orange juicer, which meets the objectives, advantages and features above set forth. The mechanism is relatively simple in construction so as to be capable of a long operating life without adjustment or attention. The mechanism is operated by a single motor which is independent of the other operating mechanisms of an automatic juicing machine so as to be capable of easy repair and simple construction. The operations are interrelated so as to provide a compact mechanism capable of construction with strong parts which can be inexpensively manufactured.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a drink dispensing machine, means defining a filling station,
   cup dispensing stations positioned laterally of the filling station,
   and a delivery station,
   a pair of cup delivery arms movable alternately from their dispensing stations to the filling station to alternately deliver cups to the filling station, a cup pushout arm movable from the filling station to the delivery station, an operating motor operable through a cycle having first and second portions for driving said arms, a first drive means including a Geneva drive having a driving portion driven through 360° by the motor during a motor cycle and including a Geneva driven portion operable through 180° in a full motor cycle and operable through another 180° in a subsequent motor cycle, a delivery arm cam connected to said driven portion and having an operating portion and a rest portion each covering 180°, said cup delivery arm having followers engaged by said cam so that the delivery arms are alternately each operated in successive motor cycles, said Geneva driven portion operated in the first portion of the motor cycle, and second drive means for operating the pushout arm including a cup pushout cam operating a follower on the pushout arm and having a rest portion during the first portion of the cycle of the motor and an operating portion for moving the arm during the second portion of the cycle of the motor.

2. In a drink dispensing machine, means defining a filling station, cup dispensing stations positioned laterally of the filling station, and a delivery station, a pair of cup delivery arms movable alternately from their dispensing stations to the filling station to alternately deliver cups to the filling station, a cup pushout arm movable from the filling station to the delivery station, an operating motor operable through a cycle having first and second portions, first drive means for operating the delivery arms and operating one of said arms through a first cycle of operation of the motor and the other delivery arm through a second cycle of operation and being operated during the first portion of the motor cycle, second drive means for operating the pushout arm being operated by the motor during the second portion of its cycle, means for initiating the first portion of the cycle of the motor, means for automatically stopping the motor at the end of the first portion of its cycle, a cup weighing scale at the filling station having means for initiating the second cycle when the cup reaches a predetermined weight, and means for terminating the second portion of the cycle of motor operation.

3. In a drink dispensing machine, means defining a filling station, cup dispensing stations positioned laterally of the filling stations, and a delivery station, a pair of cup delivery arms movable alternately from their dispensing stations to the filling station to alternately delivery cups to the filling station, a cup pushout arm movable from the filling station to the delivery station, an operating motor operable through a cycle having a first portion and a second portion for driving the arms, first drive means for operating the delivery arms operable during the first portion of the motor cycle and operating one of said arms during a first motor cycle and the other of said arms during a second motor cycle, second delivery means for operating the pushout arm during the second portion of the motor cycle, means for initiating the first portion of the cycle of the motor, a switch means for stopping the motor, a cam driven by the motor having switch actuating surfaces 180° apart for stopping the motor at the end of each of the cycles, and a cup weighing scale at the filling station having means for initiating the second cycle when the cup reaches a predetermined weight.

4. In a drink dispensing machine, means defining a filling station, cup dispensing stations positioned laterally of the filling station, and a delivery station, a pair of cup delivery arms movable alternately from their dispensing stations to the filling station to alternately deliver cups to the filling station, a cup pushout arm movable from the filling station to the delivery station, a door between the filling station and the delivery station and openable to permit movement of the cup to the delivery station, an operating motor operable through a cycle having first and second portions, first drive means for operating the delivery arms and operating one of said arms through a first cycle of the motor and the other of the arms through a second cycle of the motor, said first drive means operable in the first portion of the motor cycle, a gear driven by the motor, said first drive means including a driven gear carrying a driving portion of a Geneva drive and further including a driven portion of a Geneva drive carrying an arm operating cam having a rest portion extending for 180° and an operating portion extending for 180°, said first drive means further including crank arms and followers engaging the cam 180° apart to alternately operate the arms for each 180° of movement of the cam, said Geneva drive operating the cam in the first portion of the motor cycle, second drive means including a cam connected to said motor driven gear with an arm operating follower, said arm operating follower actuated during the second portion of the motor cycle, a pivotal support for the pushout arm, a door operating cam arm connected to said pivotal support, a door operating follower connected to the door, and a link connected between the arm operating follower of the second drive means and the pivotal support for the pushout arm to operate the door and pushout arm during the second portion of the motor cycle.

5. In a drink dispensing machine, means defining a filling station and a delivery station, a pushout arm movable between the filling station and the delivery station, a door between said stations, a drive motor for operating said arm and said door, a pivotal mount for said pushout arm, a cam arm secured to the pivotal mount to pivot with the pushout arm, a pivotal follower arm engaged by the cam arm, a pivotal support for the door, an operating arm secured to the door and connected to the follower arm to pivot the door with movement of the cam arm against the follower arm, a cam operated by said drive motor, and a follower connected to said cam having a link connected to the pivotal mount for the pushout arm for simultaneous operation of the door and pushout arm with operation of the motor.

6. In a drink dispensing machine, means defining a filling station and a delivery station, a push out arm pivotally movable between the filling station and the livery station, a door between said stations pivotally mounted for movement from a closed to an open position, an operating arm secured to the door,
a pivotal follower arm having one end pivotally mounted and the other end connected to said operating arm,
a cam arm movable against the side of the follower arm between said ends to pivot the arm and open the door,
said cam arm secured to the push out arm to pivot therewith,
and a drive motor for operating said push out arm.

References Cited by the Examiner

UNITED STATES PATENTS

| | | | |
|---|---|---|---|
| 2,019,016 | 10/1935 | McLellan | 141—174 |
| 2,317,006 | 4/1943 | Weightman et al. | 141—174 |
| 2,591,507 | 4/1952 | Brous | 141—176 XR |
| 2,817,935 | 12/1957 | Fisher et al. | 141—174 XR |

LAVERNE D. GEIGER, *Primary Examiner.*